US005310591A

United States Patent [19]

Dodge et al.

[11] Patent Number: 5,310,591

[45] Date of Patent: May 10, 1994

[54] IMAGE-RECEPTIVE SHEETS FOR PLAIN PAPER COPIERS

[75] Inventors: Bill H. Dodge, North St. Paul, Minn.; William H. Hughes, Austin, Tex.; Steven J. McMan, Stillwater, Minn.; Sharon L. Perry, Round Rock; Manisha Sarkar, Austin, both of Tex.

[73] Assignee: Minnesota Mining and Manufacturing Company, St. Paul, Minn.

[21] Appl. No.: 30,699

[22] Filed: Mar. 12, 1993

Related U.S. Application Data

[63] Continuation-in-part of Ser. No. 947,252, Sep. 18, 1992.

[51] Int. Cl.[5] .............................................. B32B 9/00

[52] U.S. Cl. .................................. 428/195; 428/206; 428/327; 428/518; 428/520; 428/688

[58] Field of Search ............... 428/327, 518, 520, 486, 428/412, 419, 513, 336, 195, 206, 518, 688; 427/171, 173, 174, 210, 211, 428

[56] References Cited

U.S. PATENT DOCUMENTS

| | | | |
|---|---|---|---|
| 3,539,340 | 11/1970 | Dolce et al. | 96/1.4 |
| 3,904,877 | 9/1975 | Hasegawa et al. | 250/317 |
| 4,071,362 | 1/1978 | Takenaka et al. | 96/1.4 |
| 4,085,245 | 4/1978 | DeVito et al. | 428/215 |
| 4,259,422 | 3/1981 | Davidson et al. | 430/17 |
| 4,480,003 | 10/1984 | Edwards et al. | 428/329 |
| 4,493,872 | 1/1985 | Funderburk et al. | 428/332 |
| 4,585,687 | 4/1986 | Posey et al. | 428/195 |
| 4,745,019 | 5/1988 | Posey et al. | 428/143 |
| 4,869,955 | 9/1989 | Ashcraft et al. | 428/327 |
| 4,912,009 | 3/1990 | Amering et al. | 430/137 |
| 4,952,650 | 8/1990 | Young et al. | 526/194 |
| 4,956,223 | 9/1990 | Aria et al. | 428/212 |
| 4,956,225 | 9/1990 | Malhotra | 428/216 |
| 5,104,731 | 4/1992 | Gager | 428/323 |
| 5,130,189 | 7/1992 | Hart | 428/331 |
| 5,167,987 | 12/1992 | Yu | 427/171 |

FOREIGN PATENT DOCUMENTS

| | | | |
|---|---|---|---|
| 1-160817 | 6/1989 | Japan | B32B 27/36 |

*Primary Examiner*—Patrick J. Ryan
*Assistant Examiner*—William A. Krynski
*Attorney, Agent, or Firm*—Gary L. Griswold; Walter N. Kirn; Darla P. Neaveill

[57] ABSTRACT

A transparent image-recording sheet suitable for use in a plain paper copier, comprising a transparent backing having two major surfaces, said sheet having a machine direction, and a transverse direction, at least one of the major surfaces having coated thereon, a transparent water-based toner-receptive coating comprising:

a) from about 65 to about 99.9 parts of an imageable polymer;
b) from about 0.1 to about 15 parts of at least one polymeric particle having a mean particle size ranging from about 1 $\mu m$ to about 15 $\mu m$, and
c) from 0 to about 20 parts of an antistatic agent, the toner-receptive coating being coated onto the transparent backing at a time during manufacture of the backing selected from the group consisting of a) before any orientation of said film, and
b) after uniaxial orientation in the machine direction.

16 Claims, No Drawings

IMAGE-RECEPTIVE SHEETS FOR PLAIN PAPER COPIERS

BACKGROUND OF THE INVENTION

This application is a continuation-in-part of United States Ser. No. 07/947,252, filed Sep. 18, 1992.

The invention relates to transparencies for plain paper copiers having a transparent backing and an image-receptive coating.

DESCRIPTION OF THE RELATED ART

Oriented films, such as biaxially oriented poly(ethylene terephthalate) films, are widely used as a base for transparency films. To improve imageability of such films either in an electrographic or xerographic copier, a thermal printer, an ink jet printer and the like, such films are usually overcoated with an image-receptive layer. Such image-receptive layers are usually coated onto the films after biaxial orientation and/or heat setting to generate a ready to use imaging receptor. Most commercially available image receptors are made in this manner and the patent literature is full of such examples. These can be found in U.S. Pat. Nos. 3,539,340; 4,071,362; 4,085,245; 4,259,422 and 4,956,223. Image receptors specifically useful for electrographic and xerographic copiers are also disclosed in U.S. Pat. Nos. 4,480,003; 4,869,955; 4,956,225 and 5,104,731.

The disadvantage of making image-receptors in this manner is the additional processing involved where biaxially oriented films are usually made at one location, rolled into jumbos, transported to another location, unrolled and coated with the image receptive coating. Time and money can be saved if the image-receptive coating could be coated onto the film, either after casting, and/or uniaxial orientation, prior to any final heat setting process. Primed films where a primer layer was coated onto the film during its manufacturing process had been disclosed.

U.S. Pat. No. 4,493,872 discloses a coated oriented plastic film wherein the coating is applied in an aqueous medium comprising a water dispersible copolyester during manufacture of the film, at any suitable stage, i.e., before, during, or after the stretching operations.

U.S. Pat. Nos. 4,585,687 and 4,745,019 disclose a primer coated, oriented polyester film material wherein the primer is applied in an aqueous medium comprising a water dispersible copolyester at any suitable stage during the manufacture of the film, again either before, during or after the stretching operations. Slip agents such as silicas are mentioned as additives in the coating solution.

Japanese Patent Publication Hei-Sei 1-160817 discloses a polyester film with antistatic properties, characterized by the fact that on at least one side of the polyester film is a thin layer comprising an acrylic-type binder resin, a copolymerized polyester resin, a microscopic particle having an average diameter of below 0.5 μm, and an antistatic agent. This coating is applied to the polyester film surface before the crystallization orientation is completely finished on the surface of the un-oriented film, or on the surface of the film that is oriented in at least one direction, in an aqueous medium. The microscopic particles described can be polymeric, such as polystyrene, polymethylmethacrylate, polymethylmethacrylate copolymer material, polymethylmethacrylate copolymer material crosslinking agent, polytetrafluoroethylene, polyvinylidiene fluoride, polyacrylonitrile, benzoguanamine resin, etc., organic microscopic particle powders; silica, alumina, titanium dioxide, etc., and other inorganic particle powders. Among these, the organic particle powders, especially the polymethylmethacrylate powder material is preferred. The average diameter of the particles is preferably in the range of 0.01 to 0.15 μm In the case the diameter is greater than 0.55 μm, the transparency properties and the durability properties are deteriorated.

In the previous references, the image-receptive coating is always applied to the backing film after the film has been completely processed.

The present inventors have now discovered a new type of transparent film having an image-receptive coating useful for producing an image on various copiers using a variety of toners with differing binder resins, with excellent toner adhesion, good image quality and good feedability, wherein the image-receptive coating is coated onto the film during the actual manufacturing of the film, rather than subsequent to the formation of the film.

SUMMARY OF THE INVENTION

The invention provides a transparent image-recording sheet suitable for use in a plain paper copier, comprising a transparent backing, bearing on at least one major surface thereof, a transparent water-based toner-receptive coating comprising:

a) from about 65 to about 99.9 parts of an imageable polymer;

b) from about 0.1 to about 15 parts of at least one polymeric particle having a mean particle size ranging from about 1 μm to about 15 μm, and c) from 0 to about 20 parts of an antistatic agent, said toner-receptive coating being coated onto said transparent backing at a time during manufacture of said backing selected from the group consisting of a) before orientation of said film, and b) after uniaxial orientation.

Preferred image-recording sheets of the invention comprise a transparent backing bearing on at least one major surface thereof, a toner-receptive coating comprising:

a) from about 65 to about 99.9 parts of an imaging copolymer formed from 1) from about 80 parts to about 99 parts of at least one monomer selected from the group consisting of bicyclic alkyl (meth)acrylates, aliphatic alkyl (meth)acrylates having from about one to about 12 carbon atoms, aromatic (meth)acrylates, and 2) from about 1 part to about 20 parts of a polar monomer having the formula:

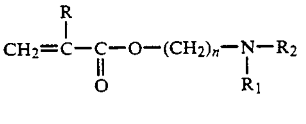

wherein R is hydrogen or methyl, $R_1$ and $R_2$ is selected from the group consisting of hydrogen, identical, and differing alkyl groups having up to about 8 carbon atoms, preferably up to about 2 carbon atoms, the N-group can also comprise a cationic salt thereof, and b) from about 0.1 to about 15 parts of at least one polymeric particle having a mean particle size ranging from about 1 to about 15 μm, and c) from 0 to about 20 parts of an antistatic agent selected from the group consisting of cationic agents, anionic agents, fluorinated agents, and nonionic agents, said toner-receptive coating being coated onto said transparent backing during the manufacturing thereof.

In one preferred embodiment, image-recording sheets of the invention comprise a particulate filler system comprising at least one polymeric particle comprising:

1) at least about 20 parts by weight polymerized diol di(meth)acrylate having a formula $$CH_2{=}CR^2COOC_nH_{2n}OOCR^2{=}CH_2$$

wherein $R^2$ is hydrogen or a methyl group, and n is an integer from about 4 to about 18, 2) from 0 to about 80 parts of at least one copolymerized vinyl monomer having the formula $$CH_2{=}CR^2COOC_mH_{2m+1}$$

wherein $R^2$ is hydrogen or a methyl group and m is an integer of from about 12 to about 40, and 3) from 0 to about 30 parts of at least one copolymerized ethylenically unsaturated monomer selected from the group consisting of vinyl esters, acrylic esters, methacrylic esters, styrene, derivatives thereof, and mixtures thereof, a, b and c having a total of 100 parts, and having an average particle size of from about 0.25 μm to about 15 μm; however, a narrow particle size distribution is also preferred, i.e., a standard deviation of up to 20% of the average particle size.

In a more preferred embodiment, the image-recording sheets of the invention comprise a bi-modal particulate filler system wherein at least one of the particles comprises a polymeric particle as described above.

The toner receptive layer can be coated out of a water-based emulsion or aqueous solution using well-known coating techniques. For sheets coated out of a solution, the polar monomer is a cationic salt selected from the group consisting of

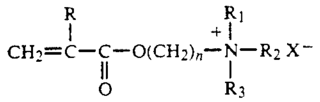

wherein R is hydrogen or methyl, $R_1$ and $R_2$ may be hydrogen, identical or differing alkyl groups having up to about 8 carbon atoms, preferably up to about 2 carbon atoms, $R_3$ is an alkyl group having up to twenty carbon atoms containing a polar group such as —OH, —$NH_2$, COOH, and $X^-$ is a halide. To make the polymer water soluble, it is preferred to have the cationic monomer with fewer carbon atoms.

The coating polymer can be prepared using any typical emulsion polymerization technique in an aqueous medium.

As used herein, the term "polymer" includes both homopolymers and copolymers.

As used herein, the term "manufacturing" means the actual making of the article, such as a film, rather than any post-processing steps.

As used herein, the term "orientation" means stretching of a film, which may be either in a single "uniaxial" direction, or in two directions simultaneously "biaxially".

All parts, percents, and ratios herein are by weight unless otherwise noted.

DETAILED DESCRIPTION OF THE INVENTION

Image-receptive sheets of the invention have a toner-receptive coating containing an image-receptive layer comprising from about 65 parts to about 99.9 parts of an imaging polymer.

The imaging polymer can be any polymer or polymer blend that can be coated out of a water-based emulsion of aqueous solution, using any well-known coating technique. Such copolymer can be made from any ethylenically unsaturated monomers and can include acrylates and methacrylates, styrenes, substituted styrenes and vinylidine chlorides. These polymers can be subjected to stretching without adversely affecting the functional properties of the imaging layer.

The preferred imaging copolymer contains from about 80 parts to about 99 parts of at least one monomer selected from the group consisting of bicyclic alkyl (meth)acrylates, aliphatic alkyl (meth)acrylates having from about one to about twelve carbon atoms, and aromatic (meth)acrylates.

Copolymers containing at least one bicyclic alkyl (meth)acrylate are preferred for use with most commercial copiers, as they improve the adhesion of toner to the image receptive coating. Useful bicyclic (meth)acrylates include, but are not limited to, dicyclopentenyl (meth)acrylate, norbornyl (meth)acrylate, 5-norborene-2-methanol, and isobornyl (meth)acrylate. Preferred bicyclic monomers include dicyclopententyl (meth)acrylate, and isobornyl (meth)acrylate.

Useful aliphatic alkyl (meth)acrylates include, but are not limited to, methyl acrylate, ethyl acrylate, methyl (meth)acrylate, isobutyl (meth)acrylate, isodecyl (meth)acrylate, cyclohexyl (meth)acrylate, and the like. Preferred aliphatic monomers include methyl (meth)acrylate, ethyl (meth)acrylate, and isodecyl (meth)acrylate.

For imaging polymers to be emulsion polymerized, the bicyclic alkyl (meth)acrylates preferably comprise from about 10 parts to about 80 parts, more preferably from 20 parts to about 60 parts. For solution polymers, the preferred minimum amount is lower, i.e., about 5 parts, more preferably about 10 parts.

Most copiers have a styrene based toner system; the addition of styrene and substituted styrene monomers yield imaging sheets having very good toner adhesion with such machines.

The copolymer must also contain from about 1 to about 20 parts of a polar monomer having the formula:

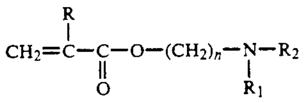

wherein R is hydrogen or methyl, $R_1$ and $R_2$ is selected from the group consisting of hydrogen, identical, and differing alkyl groups having up to about 8 carbon atoms, preferably up to about 2 carbon atoms; the N-group can also comprise a cationic salt thereof.

Useful examples include N,N-dialkyl monoalkyl amino ethyl (meth)acrylate, and N,N-dialkyl monoalkyl amino methyl (meth)acrylate, N-butyl amino ethyl (meth)acrylate, and the like for emulsion polymers, and quaternary ammonium salts thereof for solution polymers. Preferred monomers include N,N'-diethylaminoethyl(meth)acrylate, and N,N'-dimethylaminoethyl(meth)acrylate for emulsion polymers and bromoethanol salts of N,N'-dimethyl aminoethyl(meth)acrylate, and N,N'-diethyl aminoethyl(meth)acrylate for solution polymers. The presence of these polar monomers improves the adhesion of the toner receptive coating to the transparent film substrate or backing.

Preferred copolymers comprise at least two monomers selected from aliphatic alkyl (meth)acrylate monomers and bicyclic alkyl (meth)acrylates.

Polymeric particles useful in the present invention can range from about 1 μm to about 15 μm in diameter and can include poly(methylmethacrylate) (PMMA), modified poly(methylmethacrylate), poly(tetrafluorethylene), polyethylene, particles produced from diol di(meth)acrylate homopolymers which impart anti-friction characteristics when coated on image recording sheets. These diol di(meth)acrylates can be reacted with long-chain fatty alcohol esters of (meth)acrylic acid. Preferred embodiments contain particles selected from PMMA, modified PMMA, and particles produced from either diol-di(meth)acrylate homopolymers or copolymers of diol di(meth)acrylates and long-chain fatty alcohol esters of (meth)acrylic acid.

Specifically the microspheres comprise at least about 20 percent by weight polymerized diol di(meth)acrylate having a formula $$CH_2{=}CR_2COOC_nH_{2n}OOCCR_2{=}CH_2$$

wherein $R_2$is hydrogen or a methyl group, and n is an integer from about 4 to about 18. Examples of these monomers include those selected from the group consisting of 1,4-butanediol di(meth)acrylate, 1,6-hexanediol di(meth)acrylate, 1,8-octanediol di(meth)acrylate, 1,10-decanediol di(meth)acrylate, 1,12-dodecanediol di(meth)acrylate, 1,14-tetradecanediol di(meth)acrylate, and mixtures thereof.

Preferred monomers include those selected from the group consisting of 1,4-butanediol di(meth)acrylate, 1,6 hexanediol di(meth)acrylate, 1,12-dodecanediol di(meth)acrylate, and 1,14-tetradecanediol di(meth)acrylate.

The microspheres may contain up to about 80 weight percent of at least one copolymerized vinyl monomer having the formula $$CH_2{=}CR_2COOC_mH_{2m+1}$$

wherein $R^2$ is hydrogen or a methyl group and m is an integer of from about 12 to about 40.

Useful long-chain monomers include, but are not limited to lauryl (meth)acrylate, octadecyl (meth)acrylate, stearyl (meth)acrylate, and mixtures thereof, preferably stearyl (meth)acrylate.

The microspheres may optionally contain up to about 30 percent by weight of at least one copolymerized ethylenically unsaturated monomer selected from the group consisting of vinyl esters such as vinyl acetate, vinyl propionate, and vinyl pivalate; acrylic esters such as methacrylate, cyclohexylacrylate, benzylacrylate, isobornyl acrylate, hydroxybutylacrylate and glycidyl acrylate; methacrylic esters such as methyl methacrylate, butyl methacrylate, cyclohexyl methacrylate, benzyl methacrylate, γ-methacryloxypropyl trimethoxysilane, and glycidyl methacrylate; styrene; vinyltoluene; α-methyl styrene, and mixtures thereof.

Highly preferred beads include those comprising 50/50 poly(hexanediol-diacrylate/stearyl methacrylate), and 50/50 poly(butanediol-diacrylate)\lauryl(meth)acrylate, 80/20 poly(hexanedioldiacrylate)/stearyl(meth)acrylate, 50/50 polymethylmethacrylate/1,6 hexanedioldiacrylate, $C_{14}$ dioldiacrylate, $C_{12}$ dioldi(meth)acrylate, and 40/50/10 poly(hexanedioldiacrylate)/stearyl(meth)acrylate/glycidyl(meth)acrylate.

In addition to the above, beads of the present invention may also optionally comprise additives which are not ethylenically unsaturated, but which contain functional groups capable of reacting with materials containing reactive groups which may also be coated on the substrate along with the anti-friction beads. Such additives are useful in modifying the degree of interaction or bonding between the beads and the imaging polymer. Suitable examples include organosilane coupling agents having alkyl groups with 1 to about 8 carbon atoms, such as glycidoxy trimethoxysilanes such as γ-glycidoxypropyltrimethoxysilane, and (aminoalkylamino) alkyl trimethoxysilanes such as 3-(2-amino ethyl amino) propyl trimethoxysilane.

For good feedability, the mean particle size preferably ranges from about 1 μm to about 15 μm. Particles ranges from about 1 μm would require the use of more particles to produce an effective coefficient of friction, this would tend to also produce more haze. Larger particles than 15 μm would require thicker coatings to anchor the particles firmly in the coatings, which would increase haze and coating cost. For good performance, the particles preferably have narrow particle size distributions, i.e., a standard deviation of up to 20% of the average particle size. These ranges are preferably 1-6 μm, 3-6 μm, 4-8 μm, 6-10 μm, 8-12 μm, 10-15 μm.

In one preferred embodiment of the invention, a particle system containing more than one particle is used, wherein the particles have a bimodal particle size distribution. This is done by mixing particles having 2 different particle size distributions such as particles having a distribution of sizes from 1-4 μm mixed with 6-10 μm.

When bimodal particle systems are used, both particles can be selected from the preferred polymeric beads described above, or one of the particles can be selected from such preferred beads and one selected from other beads such as PMMA and modified PMMA beads, the second type of bead also preferably having a narrow particle size distribution.

When a bimodal particle system is used, particles having a size smaller than 1 μm can be used as one of the particles. For example, a particle having a size of from about 0.1 μm to about 0.7 μm can be mixed with a particle having a size of from about 1 μm to about 6 μm.

Most preferably, both bimodal particles are selected from beads produced from the copolymer of hexanedioldiacrylate and stearylmethacrylate, having particle size distributions of from about 1 to about 4 μm and from about 6 to about 10 μm, or from about 2 to about 6 μm and from about 8 to about 12 μm, or from about 0.20 to 0.5 μm and from about 1-6 μm.

Coatings for the final image-receptive sheets useful for copying devices typically range in thickness from 100 nm to 1500 nm, preferably 200 nm to 500 nm. If large particles are used, then the coating thickness must be increased accordingly to ensure that enough coating material is present to anchor the particles onto the transparent substrate, while the coating thickness can be correspondingly lowered for smaller particles. Hence the most preferred particle size distributions chosen reflect more on the coating thickness than the feeding performance of other larger particle sizes and vice versa.

The microspheres are polymerized by means of conventional free-radical polymerization, e.g., those suspension polymerization methods described in U.S. Pat. No. 4,952,650, and 4,912,009, incorporated herein by reference, or by suspension polymerization using a surfactant as the suspending agent, and use those initiators normally suitable for free-radical initiation of acrylate monomers. These initiators include azo compounds such as 2,2-azobis(2-methyl butyronitrile) and 2,2-azobis(isobutyronitrile); and organic peroxides such as benzoylperoxide and lauroylperoxide. For submicron beads, suspension polymerization is used wherein the suspending agent is a surfactant.

An antistatic agent may also be present in the toner receptive layer. Useful agents are selected from the group consisting of nonionic antistatic agents, cationic agents, anionic agents, and fluorinated agents. Useful agents include such as those available under the trade name AMTER TM, e.g., AMTER TM 110, 1002, 1003, 1006, and the like, derivatives of Jeffamine TM ED-600, 900, 2000, and 4,000, with FX8 and FX10, available from 3M, Larostat TM 60A, and Markastat TM AL-14, available from Mazer Chemical Co., with the preferred antistatic agents being steramido-propyldimethyl-$\beta$-hydroxy-ethyl ammonium nitrate, available as Cyastat TM SN, N,N'-bis(2- hydroxyethyl)-N-(3'-dodecyloxy-2,2-hydroxylpropyl) methylammonium methylsulfate, available as Cyastat TM 609, both from American Cyanamid. When the antistatic agent is present, amounts of up to 20% (solids/solids) may be used. Preferred amounts vary, depending on coating weight. When higher coating weights are used, 1–10% is preferred, when lower coating weights are used, 5–15% is preferred.

Where emulsion polymerization of the image polymer layer is desired, an emulsifier must also be present. These include nonionic, or anionic emulsifiers, and mixtures thereof, with nonionic emulsifiers being preferred. Suitable emulsifiers include those having a HLB of at least about 10, preferably from about 12 to about 18. Useful nonionic emulsifiers include $C_{11}$ to $C_{18}$ polyethylene oxide ethanol, such as Tergitol TM especially those designated series "S" from Union Carbide Corp, those available as Triton TM from Rohm and Haas Co., and the Tween TM series available from ICI America. Useful anionic emulsifiers include sodium salts of alkyl sulfates, alkyl sulfonates, alkylether sulfates, oleate sulfates, alkylarylether sulfates, alkylarylpolyether sulfates, and the like. Commercially available examples include such as those available under the trade names Siponate TM and Siponic TM from Alcolac, Inc.

When used, the emulsifier is present at levels of from about 1% to about 7%, based on polymer, preferably from about 2% to about 5%.

Additional wetting agents with HLB values of 7–10 may be present in the emulsion to improve coatability. These additional surfactants are added after polymerization is complete, prior to coating of the polymeric substrate. Preferred additional wetting agents include fluorochemical surfactants such as $$\begin{array}{l} C_8F_{17}SO_2N-C_2H_5 \\ \qquad\qquad\ | \\ \qquad\quad (C_2H_4O)_nR \end{array}$$

wherein n is from about 6 to about 15 and R can be hydrogen or methyl. Useful examples include FC-170C and FC-171, available from 3M. Another useful wetting agent is Triton TM X-100, available from Union Carbide.

Addition of a coalescing agent is also preferred for emulsion based image receptive layers to insure that the coated material coalesces to form a continuous and integral layer and will not flake in conventional copiers under copying and fixing conditions.

Compatible coalescing agents include propylcarbitol, available from Union Carbide as the Carbitol TM series, as well as the Cellusolve TM series, Propasolve TM series, Ektasolve TM and Ektasolve series of coalescing agents, also from Union Carbide. Other useful agents include the acetate series from Eastman Chemicals Inc., the Dowanol TM E series, Dowanol TM E acetate series, Dowanol TM PM series and their acetate series from Dow Chemical, N-methyl-2-pyrrolidone from GAF, and 3-hydroxy-2,2,4-trimethyl pentyl isobutyrate, available as Texanol TM, from Eastman Chemicals Inc. These coalescing agents can be used singly or as a mixture.

Other optional ingredients may be present in the image-forming polymer for the purposes of improving coatability, or other features. Useful additives include such as catalysts, thickeners, adhesion promotors, glycols, defoamers and the like.

One preferred optional ingredient in the emulsion polymerized embodiment of the invention is an additional adhesion promotor to enhance durability of thicker coatings to the substrate. Useful adhesion promotors include organofunctional silanes having the following general formula:

$$\begin{array}{c} R_1 \\ | \\ R_2-Si-(CH_2)_n-Y \\ | \\ R_3 \end{array}$$

wherein $R_1$, $R_2$, and $R_3$ are selected from the group consisting of an alkoxy group and an alkyl group with the proviso that at least one alkoxy group is present, n is an integer from 0 to 4, and Y is an organofunctional group selected from the group consisting of chloro, methacryloxy, amino, glycidoxy, and mercapto. Useful silane coupling agents include such as $\gamma$-aminopropyl trimethoxysilane, vinyl triethoxy silane, vinyl tris($\beta$-methoxy ethoxy)-silane, vinyl triacetoxy silane,$\gamma$-methacryloxypropyltrimethyoxy silane, $\gamma$-($\beta$-aminoethyl)aminopropyl trimethoxysilane, and the like. The adhesion promotor may be present at levels of from about 0.5 to about 15% of the total resin, preferably from about 4% to about 10%.

Film substrates may be formed from any polymer capable of forming a self-supporting sheet, e.g., films of cellulose esters such as cellulose triacetate or diacetate, polystyrene, polyamides, vinyl chloride polymers and copolymers, polyolefin and polyallomer polymers and copolymers, polysulphones, polycarbonates, polyesters, and blends thereof. Suitable films may be produced from polyesters obtained by condensing one or more dicarboxylic acids or their lower alkyl diesters in which the alkyl group contains up to about 6 carbon atoms, e.g., terephthalic acid, isophthalic, phthalic, 2,5-,2,6-, and 2,7-naphthalene dicarboxylic acid, succinic acid, sebacic acid, adipic acid, azelaic acid, with one or more glycols such as ethylene glycol, 1,3-propanediol, 1,4-butanediol, and the like.

Preferred film substrates or backings are cellulose triacetate or cellulose diacetate, poly(ethylene naphthalate), polyesters, especially poly(ethylene terephthalate), and polystyrene films. Poly(ethylene terephthalate) is most preferred. It is preferred that film backings have a caliper ranging from about 50 μm to about 200 μm. Film backings having a caliper of less than about 50 μm are difficult to handle using conventional methods for graphic materials. Film backings having calipers over 200 μm are stiffer, and present feeding difficulties in certain commercially available copying machines. However, the preferred caliper varies with the type of copying machine and its requirements, with e.g., color copiers easily handling thick backings.

When polyester film substrates are used, they can be biaxially oriented to impart molecular orientation, and may also be heat set for dimensional stability during fusion of the image to the support. These films may be produced by any conventional extrusion method.

In one preferred embodiment, the polyester film is formed by extrusion or casting. The imaging layer is coated thereon immediately subsequent to the forming. After coating, it is dried in an oven and then either uniaxially oriented in the machine direction to produce a finished product, or simultaneously biaxially oriented to produce a finished product.

In another preferred embodiment, the polyester film is extruded or cast, and uniaxially oriented in the machine direction. The imaging layer is coated thereon immediately subsequent in the processing line. After coating, it is dried in an oven, and then further oriented in the transverse direction to produce a finished product.

Surprisingly, the use of large polymeric beads, i.e., larger than 1 μm, does not significantly affect the optical properties of the final, transparent image-receptive sheet even through the image-receptive layer is stretched after coating. When this process is used, the coated layer exhibits evidence of such stretching under optical microscopy, but surprisingly, the coating remains transparent, and the polymer, whether emulsion or solution polymerized, exists in a continuous coated layer without voids, thus showing the high integrity and cohesiveness of the coated layer.

Optionally, and prior to orientation in the transverse direction, a second imaging layer can be coated onto the opposing surface of the film and dried. This second layer can be an identical or different composition to the first layer.

Image-recording sheets of the invention surprisingly do not require a primer layer or surface treatment such as corona treatment in order to exhibit good adhesion of the receptive layer to the film substrate, which is common in products of this type.

The image-recording sheet of the invention may also comprise an ink-permeable protective layer such as polyvinyl alcohol, and the like, to insure faster drying. Such layers can be coated onto the imaging layer either prior to, or after, transverse orientation. If applied before transverse orientation, an uncrosslinked layer is preferred Image-receptive sheets of the invention are particularly useful in the production of imaged transparencies for viewing in a transmission mode or a reflective mode, i.e., in association with an overhead projector.

The following examples are for illustrative purposes, and do not limit the scope of the invention, which is that defined by the claims.

| Glossary | |
|---|---|
| BHT | 2 TERT-BUTYL 4-METHYL PHENOL |
| DMAEMA | DIMETHYLAMINOETHYL METHACRYLATE |
| EA | ETHYL ACRYLATE |
| GMA | GLYCIDYL METHYLACRLATE |
| HEMA | HYDROXYETHYL METHACRYLATE |
| IBOA | ISOBORNYL ACRYLATE |
| IBOMA | ISOBORNYL METHACRYLATE |
| MA | METHYL ACRYLATE |
| MMA | METHYL METHACRYLATE |
| NMP | N-METHYLPYRROLIDONE |
| PC | Propylcarbitol |
| PMMA | POLYMETHYL METHACRYLATE |
| SMA | A 50/50 HEXANEDIOLDIACRYLATE/ STEARYL METHACRYLATE BEAD |
| Z6040 | GLYCIDOXYPROPYL TRIMETHOXYSILANE |

Test Methods

Coefficient of Friction

The Coefficient of Friction, hereinafter "COF" of two stationary contacting bodies is defined as the ratio of the normal force "N", which holds the bodies together and the tangential force "$F_1$", which is applied to one of the bodies such that sliding against each other is induced.

A model SP-102B-3M90 Slip/Peel Tester, from Imass Co., was used to test the COF of articles of the invention. The bead-coated sides of two sheets are brought into contact with each other, with 1 sheet attached to a 1 kg brass sled, tethered to a force gauge and the second sheet attached to the moveable platen. The platen is drawn at a constant speed of 15.24 cm/min., and the maximum and average COF values are obtained from the tester readout and recorded.

Surface Conductivity

Surface conductivity of the coated film was measured using a Model 240A High Voltage Supply, available from Keithley Instruments, along with a Model 410A Picoammeter and a Model 6105 Resistivity Adapter. The film samples prepared were 8.75 cm×8.75 cm in size and were conditioned by sitting at 23° C. and 50% RH overnight. The surface conductivity was measured by placing the film sample between the 2 capacitor plates and applying a 500 volt charge. The surface current is then measured in amps, and converted to resistivity by using the following formula:

$$R = \frac{53.4 \times V}{I}$$

wherein R equals the resistivity (ohms/sq), V is the voltage, and I is current (amps)

Toner Adhesion Test

ASTM D2197-86 "Adhesion of Organic Coatings by Scope Adhesion" was used to measure toner adhesion to the coated surface of the film. The measurements were done on samples after the coated film was imaged on a variety of commercially available copiers, specifically Xerox 5065. The results were recorded in grams. A measurement of about 200 gms or more is acceptable.

Haze

Haze is measured with the Gardner Model XL-211 Hazeguard hazemeter or equivalent instrument. The procedure is set forth in ASTM D 1003-61 (Reapproved 1977). This procedure measures haze, both of the unprocessed film (precopy) and the post copy film, as noted hereinafter.

Coating Durability Test

Durability is measured using the SP-102B-3M90 Slip/Peel Tester available from Imass, equipped with an MB-5 load cell. The platen speed was set at 15.24 cm/minute. A 1 cm×2 cm rubber was attached by a piece of double-coated tape to the middle of the sled with the 2 cm side parallel to the direction of the sliding motion. Test samples of the image receptive film were cut into 5 cm×20 cm and 2.5 by 5 cm pieces. The 5 cm×20 cm test piece is attached with double-coated tape to the left end of the platen and both sides of the 200 g sled weight just above and below the 1 cm×2 cm rubber, The 2 cm×5 cm test piece is then attached to the 200 g sled such that the 2 cm side is parallel to the 5 cm side of the rubber. Both test pieces are pressed to assure that they are flat and centered. They are then labeled and marked. One end of a 20 cm long 12 Kg steel finishing line leader was permanently connected to the 200 gms sled and the other end to the load cell. The sled is positioned above the left end of the platen and aligned with it to assure that the leader is in a relaxed state. The sled is then gently laid onto the test sample. 500 gms of additional weight is added to the sled and the platen is activated. After travelling for a distance of about 8 cm, the platen is stopped and the sample removed to rate the durability. The ratings are according to the following scale:

1—positive for both coating removal and particle flaking.

2—negative for coating removal, positive to particle flaking.

3—positive for scratches, negative for both coating removal and particle flaking.

4—negative for scratches, coating removal and particle flaking.

Stack Feeding Test

This test defines the number of failures per 100 sheets fed. Receptor sheets were conditioned in a stack at a temperature of 25° C. and 50% relative humidity, overnight prior to feed testing. Any jamming, misfeed or other problems during the copying process was recorded as a failure.

Preparation of Polymeric Beads

A. Preparation of Diethanolamine-Adipic Acid Condensate Promoter. Equimolar amounts of adipic acid and diethanolamine were heated and stirred in a closed reaction flask. Dry nitrogen was constantly bubbled through the reaction mixture to remove water vapor, which was condensed and collected in a Barrett trap. When 1-1.5 moles of water based on 1 mole of adipic acid and 1 mole of diethanolamine had been collected, the reaction was stopped by cooling the mixture. The resulting condensate was diluted with water.

B. An aqueous mixture of 600 g deionized water, 10 g Ludox SM-30 colloidal silica, available from DuPont, 2.4 gms of 10% solution of diethanolamineadipic acid condensate promoter (supra) and 0.13 gm of potassium dichromate was stirred and adjusted to pH 4 by addition of 10% sulphuric acid. A monomer solution of 32 gms of 1,3-butanediol diacrylate (BDDA, available from Sartomer), and 0.15 gm of Vazo 64, (available from DuPont) was added to 56 gm of the aqueous mixture and then stirred in a Waring TM blender for two minutes at the low speed setting. The mixture was then poured into a glass bottle which was then purged with nitrogen, sealed and placed in a shaker water bath at 70° C. for 20 hours. The contents of the bottle were then collected on a Buchner funnel and washed several times with water to yield a wet cake. The wet cake was then dried at ambient temperature to give free-flowing powder.

Polymeric beads having other compositions could also be prepared using such a procedure. These include beads having varying ratios of hexanedioldiacrylate and stearyl methacrylate, mixtures of BDDA and SMA, BDDA and lauryl acrylate, and the like.

Preparation of Submicron Polymeric Beads

A mixture of 192 gms of 1,6-hexanedioldiacrylate, available from Sartomer, 192 gms of stearyl methacrylate, available from Rohm and Haas, and 1.2 gms of Vazo TM 64, available from DuPont was stirred in a beaker until the Vazo was completely dissolved. It was then added to a 2 liter resin flask containing 28.8 gms of "Dehyquart A", a 25% solution of cetyltrimethylammonium chloride, available from Henkel Corp., and 820 gms of DI water. The flask was then stirred at 700 rpm for 2 minutes. A coarse emulsion was obtained, which was then passed through a MantonGaulin Homogenizer from Gaulin Corp. at 500 psi. The emulsion was passed through the homogenizer a second time. The homogenized emulsion was then returned to the resin flask and heated to 60° C. It was maintained at the temperature for 15 hours under gentle agitation (400-500 rpm) with a nitrogen blanket. A stable emulsion was obtained having about 30% submicron polymeric beads. Analysis on a Coulter N4 from Coulter Electronics, Inc. revealed an average particle size of 0.25 μm.

The Examples below are illustrative of the present invention and are not limiting in nature. Variations will be apparent to those skilled in the art. The scope of the invention is solely that which is defined by the claims.

EXAMPLES

Example 1

An emulsion polymer was prepared according to the following procedure:

A. Preparation of Emulsion Polymer

The following ingredients were admixed according to the procedures described below to make a latex binder for coating on plain paper copier transparency film. The compositions are shown in Table 1.

TABLE 1

| INGREDIENTS | WEIGHT % |
|---|---|
| Deionized Water | 73.9 |
| Triton TM X405 (Union Carbide Chem. Co.) | 1.23 |
| Isobornyl Acrylate (CPS Chemical Co.) | 8.63 |
| Methyl Methacrylate (Rohm & Haas Co.) | 9.86 |
| Ethyl Acrylate (Rohm & Haas Co.) | 4.93 |
| Dimethyl Amino Ethyl Methacrylate (Rohm & Haas Co.) | 1.23 |

TABLE 1-continued

| INGREDIENTS | WEIGHT % |
|---|---|
| Carbon Tetrabromide (Olin) | 0.05 |
| Ammonium Persulfate (J. T. Baker) | 0.07 |

To prepare the present emulsion polymer, Deionized water (DI water) and surfactant (Triton X405) were charged into a four-neck flask equipped with a reflux condenser, thermometer, stirrer, metering pump and a nitrogen gas inlet. This was stirred and heated to 70° C under nitrogen atmosphere. In the meantime the monomers, IBOA, MMA, EA, DMAEMA and carbon tetrabromide (a chain transfer agent), were pre-mixed in a separate container at room temperature to make the monomer premix. When the reaction temperature leveled off at 70° C., 20% of the monomer premix and the initiator (ammonium persulfate) were charged into the reactor to start the polymerization. The reaction was allowed to exotherm. At the exotherm peak, the remaining 80% monomer premix was fed into the reaction using a metering pump over a two-hour period while the reaction temperature was maintained at 70° C. After the monomer addition, the polymerization was continued for two hours at 70° C. to eliminate residual monomers. The latex was then cooled to 25° C. and filtered through a 25 μm filter.

B. Pre-Mix Preparation

Before mixing the bulk coating solution, pre-mixes of the two particulates were made in order to obtain adequate dispersion. Master batches of both the 1.50 μm and 8 μm beads were made separately by mixing each with enough water to achieve a 25% solid suspension. Each master batch was mixed for 15 minutes after addition of the water.

After mixing for 15 minutes, the % solids of each premix was measured to verify that they were 25%. 1.36 kg of the 1.5 μm premix and 6.82 kg of the 8 μm pre-mix were weighted from their respective master batches and combined with 6.82 kg of FC-170C (10% aqueous solution) in a separate container. This mixture was mixed for 15 minutes before addition to the coating solution which is described below.

C. Coating Solution Preparation 263.5 kg of de-ionized water was added to a 150 gallon mix tank. With agitation provided by a 3 blade impeller, 3.41 kg "A-1120"was slowly added to the mixture. Agitation was maintained throughout the addition of the remaining ingredients described below. 68.2 g of Dow 65 was next added slowly to the mixture, followed by a slow addition of 15.9 kg NMP, followed by 5.27 kg Cyastat TM 609. 143.5 kg of the latex was then added slowly to the mixture. Finally, the 15 kg of pre-mix described in section "B" above was added to the mixture. This completed the solution preparation yielding a 15.30% solids mixture.

D. Coating of the Latex Coating Solution

A 1200 μm thick polyethylene terephthalate (PET) film was extruded at temperatures of about 250°-300° C. onto a casting wheel at a speed of about 25 meters/minute. It was then uniaxially oriented in the machine direction about 3.2 times. The solution from C was then coated onto one of the sides of the film and dried in an oven at about 75° C. for about 10 seconds, yielding a dry coating weight of about 1.100 grams/meter$^2$.

After drying, the film was identically coated on the opposing side, that coating was then dried in the same manner.

Finally, the film was oriented in the transverse direction 4.75 times to yield a dry coating weight of about 0.21 g/sq meter on each side.

This sheet was tested according to the test methods described and the results are shown in Tables 2 and 3.

EXAMPLE 2

This example was made in the following manner using the same emulsion polymer as Example 1:

A. Pre-mix Preparation

Before mixing the bulk coating solution, pre-mixes of the two particulates were made in order to obtain adequate dispersion. Master batches of both the 1.50 μm and 8 μm beads were made separately by mixing each with enough water to achieve a 25% solid suspension. Each master batch was mixed for 15 minutes after addition of the water.

After mixing for 15 minutes, the % solids of each premix was measured to verify that they were 25%, 0.87 kg of the 1.50 μm premix and 17.5 kg of the 8 μm pre-mix were weight from their respective master batches and combined with 4.55 kg of FC-170C (10% in water) in a separate container. This mixture was mixed for 15 minutes before addition to the coating solution which is described below.

B. Coating Solution Preparation 313.2 kg of deionized water was added to a 150 gallon mix tank. With agitation provided by a 3 blade impeller, 2.18 kg "A-1120"was slowly added to the mixture. Agitation was maintained throughout the addition of the remaining ingredients described below. 8.2 g of Dow 65 was next added slowly to the mixture. 5.82 kg propyl carbitol was then added followed by the slow addition of 12.2 kg NMP. 8.44 kg Cyastat TM 609 was then added slowly to the mixture, followed by 91.8 kg of the latex solution. Finally, the 22.92 kg of pre-mix described in section A was added to the mixture. This completed the solution preparation yielding a 0.52% solids mixture.

This example was also coated and tested according to Example 1 and the results are shown in Tables 2 and 3. The coating toughness value is slower in this case because of the extremely thin coating weight of the water-based ink-receptive coating.

EXAMPLE 3

Example 3 was made in the following manner using the same emulsion polymer as Example 1.

A. Pre-mix Preparation

Before mixing the bulk coating solution, pre-mixes of the two particulates were made in order to obtain adequate dispersion. Master batches of both the 0.25 μm enough water to achieve a 25% solid suspension. Each master batch was mixed for 15 minutes after addition of the water.

After mixing for 15 minutes, the % solids of each premix was measured to verify that they were 25%, 0.87 kg of the 0.25 μm premix and 8.73 kg of the 8 μm pre-mix were weight from their respective master batches and combined with 454 kg of FC-170C (10% in water) and 0.91 kg Triton TM X-100 (TX-100) in a separate container. This mixture was mixed for 15 minutes before addition to the coating solution which is described below.

B. Coating Solution Preparation 325.1 kg of deionized water was added to a 150 gallon mix tank. With agitation provided by a 3 blade impeller, 2.18 kg "A-1120"was slowly added to the mixture. Agitation was maintained throughout the addition of the remaining ingredients described below. 68.2 g of Dow 65 was next added slowly to the mixture. 5.82 kg propyl carbitol was then added followed by the slow addition of 10.2 kg NMP. 4.22 kg Cyastat TM 609 was then added slowly to the mixture along 4.22 kg Cyastat TM SN. 91.8 kg of the latex solution was then added slowly to the mixture. Finally, the 10.96 kg of premix described in section A was added to the mixture. This completed the solution preparation yielding a 10.24% solids mixture.

This example was also coated and tested according to Example 1 and the results are shown in Tables 2 and 3.

EXAMPLE 4

This example was made in the following manner using the same emulsion polymer as Example 1.

A. Pre-mix Preparation.

Before mixing the bulk coating solution, pre-mixes of the two particulates were made in order to obtain adequate dispersion. Master batches of both the 0.25 μm and 8 μm beads were made separately by mixing each with enough water to achieve a 25% solid suspension. Each master batch was mixed for 15 minutes after addition of the water.

After mixing for 15 minutes, the % solids of each premix was measured to verify that they were 25%, 0.87 kg of the 0.25 μm premix and 4.36 kg of the 8 μm pre-mix were weight from their respective master batches and combined with 454 g of FC-170C (10% in water) and 0.91 kg TX-100 in a separate container. This mixture was mixed for 15 minutes before addition to the coating solution which is described below.

B. Coating Solution Preparation 329.0 kg of deionized water was added to a 150 gallon mix tank. With agitation provided by a 3 blade impeller, 2.18 kg "A-1120" was slowly added to the mixture. Agitation was maintained throughout the addition of the remaining ingredients described below. 68.2 g of Dow 65 was next added slowly to the mixture. 5.82 kg propyl carbitol was then added followed by the addition of 10.2 kg NMP, both being added slowly. 4.22 kg Cyastat TM 609 and 4.22 kg Cyastat TM SN were then added slowly to the mixture followed by 91.8 kg of the latex solution. Finally, the 7.04 kg of pre-mix described in section A was added to the mixture. This completed the solution preparation yielding a 10.10% solids mixture.

This example was also coated and tested as described in Example 1, and the results are shown in Tables 2 and 3.

TABLE 2

| Ex | Ctg. Wt. ($g/m^2$) | Ctg. Toughness | C.O.F. | Toner Adh. (g) | Haze (%) Pre-Copy | Haze (%) Post-Copy | Resistivity |
|---|---|---|---|---|---|---|---|
| 1 | .23 | 2 | 0.41 | 897 | 2.3 | 3.3 | 2.4 $E^{11}$ |
| 2 | .12 | 1 | 0.35 | 1160 | 2.2 | 3.1 | 6.4 $E^{12}$ |
| 3 | .18 | 3+ | 0.20 | 938 | 2.9 | 2.6 | 8.1 $E^{10}$ |
| 4 | .22 | 3 | 0.26 | 874 | 2.1 | 1.9 | 5.8 $E^{10}$ |

TABLE 3

| Ex | Feeding Tests (Failures/100) Lanier 6155 | Xerox 5028 80% RH/27° | Ricoh 6750 | Canon 3030 | Canon 6650 |
|---|---|---|---|---|---|
| 1 | 1.3 | 0 | 0 | 0 | 0 |
| 2 | — | 0 | — | — | — |
| 3 | 4.3 | 0.7 | 0 | 0 | 0 |
| 4 | 0.3 | 0 | 0 | 0 | 0 |

EXAMPLE 5

The formulation shown below in Table 4 was admixed and coated using a procedure similar to that disclosed in the previous examples. The binder in this case is a copolymer of vinylidine chloride (90%), ethyl acrylate (9%) and itaconic acid (1).

TABLE 4

| Coating Formulation | Weight (kg) | % Solids | % of Total |
|---|---|---|---|
| Latex Binder | 33.3 | 21 | 94.44 |
| 6 μm PSMA Beads | 0.80 | 25 | 2.27 |
| 0.25 μm PSMA Beads | 0.16 | 25 | 0.45 |
| FC-170C Surfactant | 1.0 | 10 | 2.84 |

PET film was extruded onto a casting wheel at 24 ft/min. The thickness of the cast film was 1500 μm. It was then uniaxially oriented 3.2 times after which the line speed was about 24 meters/min. The film was coated on one side and dried at 75° C. for 20 seconds. The opposite side was then coated and dried using similar conditions. The air knife coating technique was used to apply and meter the solution onto the web. The coated film was then oriented in the transverse direction 4.8 times yielding the finished 100 μm film with a single side coating weight of 0.14 gms/meter$^2$ Testing results are shown in Tables 6 and 7.

The feeding failures for Example 5 are higher than acceptable, as an extremely low amount of antistatic agent was used, which resulted in low conductivity. A higher amount of antistatic agent used with an otherwise identical formulation would result in an acceptable failure rate for feedability.

EXAMPLE 6

This was made in the same manner as Example 1, except that 11 μm PMMA and 5 μm 97/3 PMMA/HEMA beads were used in place of the SMA beads. This was tested and the results are reported in Tables 5 and 6.

EXAMPLE 7

This was made in the same manner as Example 1, except that the 8 μm SMA beads were replaced with 50/40/10 SMA/HDDA/GMA beads. This was also tested and the results are reported in Tables 5 and 6.

EXAMPLE 8

This was made in the following manner using the same emulsion polymer as Example 1.

A. Pre-mix Preparation

Before mixing the bulk coating solution, pre-mixes of the two particulates were made in order to obtain adequate dispersion. Master batches of both the 0.25 μm and 8 μm beads were made separately by mixing each with enough water to achieve a 25% solid suspension. Each master batch was mixed for 15 minutes after addition of the water.

After mixing for 15 minutes, the % solids of each premix was measured to verify that they were 25%, 1.09 kg of the 0.25 μm premix and 10.9 kg of the 8 μm pre-mix were weight from their respective master batches and combined with 454 g of FC-170C (10% in water) in a separate container. This mixture was mixed for 15 minutes before addition to the coating solution which is described below.

B. Coating Solution Preparation 274.6 kg of deionized water was added to a 150 gallon mix tank. With agitation provided by a 3 blade impeller, 2.73 kg "A-1120" was slowly added to the mixture. Agitation was maintained throughout the addition of the remaining ingredients described below. 68.2 g of Dow 65 was next added slowly to the mixture. 7.27 kg propyl carbitol was then added followed by the addition of 12.73 kg NMP. Both were added slowly. 5.27 kg Cyastat TM 609 was then added slowly to the mixture along with 5.27 kg Cyastat TM SN. 134.1 kg of the latex solution was then added slowly to the mixture. Finally, the 12.44 kg of pre-mix described in section A was added to the mixture. This completed the solution preparation yielding a 12.52% solids mixture.

This example was also coated and tested as described in Example 1, and the results are shown in Tables 5 and 6.

TABLE 5

| Ex | Ctg. Wt. ($g/m^2$) | Ctg. Toughness | C.O.F. | Toner Adh. (g) | Haze (%) Pre-Copy | Haze (%) Post-Copy | Resistivity |
|---|---|---|---|---|---|---|---|
| 5 | | 3+ | 0.54 | 467 | 2.4 | 2.7 | |
| 6 | 0.14 | — | 0.37 | 274 | 1.3 | 2.0 | $<E^{13}$ |
| 7 | | 3 | 0.31 | 1160 | 3.0 | 3.4 | 1.3 $E^{10}$ |
| 8 | 0.19 | 2+ | 0.25 | 650 | 2.2 | 2.2 | 4.9 $E^{10}$ |

TABLE 6

| Examples | Feeding Tests (Failure/100) Mita Copier | Feeding Tests (Failure/100) Xerox 5028 |
|---|---|---|
| 5 | 1.5 | 10 |
| 6 | — | 1.5 |
| 7 | 0 | 0 |
| 8 | 0 | 0 |

What is claimed is:

1. A transparent image-recording sheet suitable for use in a plain paper copier, comprising a transparent backing having two major surface, said sheet having a machine direction and a transverse direction, at least one of said major surfaces having coated thereon, a water-based toner-receptive coating comprising:

a) from about 65 to about 99.9 parts of an imaging copolymer formed from 1) from about 80 to about 99 parts of at least one monomer selected from the group consisting of bicyclic alkyl (meth)acrylates, aliphatic alkyl (meth)acrylates having from about 1 to about 12 carbon atoms, and aromatic (meth)acrylates, and 2) from about 1 to about 20 parts of a polar monomer having the formula

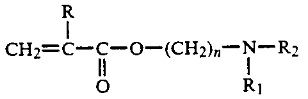

wherein R is hydrogen or methyl, $R_1$ and $R_2$ is selected from the group consisting of hydrogen, identical, and differing alkyl groups having up to about 8 carbon atoms, preferably up to 2 carbon atoms, the N-group can also comprise a cationic salt thereof.

2. A transparent image-recording sheet according to claim 1 further comprising a) from about 0.1 to about 15 parts of at least one novel polymeric particle comprising 1) at least about 20 parts by weight polymerized diol di(meth)acrylate having a formula $$CH_2{=}CR^2COOC_nH_{2n}OOCR^2{=}CH_2$$

wherein $R^2$ is hydrogen or a methyl group, and n is an integer from about 4 to about 18, 2) from 0 to about 80 parts of at least one copolymerized vinyl monomer having the formula $$CH_2{=}CR^2COOC_mH_{2m+1}$$

wherein $R^2$ is hydrogen or a methyl group and m is an integer of from about 12 to about 40, and 3) from 0 to about 30 parts of at least one copolymerized ethylenically unsaturated monomer selected from the group consisting of vinyl esters, acrylic esters, methacrylic esters, styrene, derivatives thereof, and mixtures thereof, a, b and c having a total of 100 parts, and b) from 0 to about 20 parts of an antistatic agent selected from the group consisting of cationic agents, anionic agents, fluorinated agents, and nonionic agents.

3. A transparent image-recording sheet according to claim 1 wherein said water-based, toner-receptive coating being coated onto said transparent backing before any orientation of said film.

4. A transparent image-recording sheet according to claim 3 wherein said toner-receptive coating on said second surface is coated thereon subsequent to said sheet being subjected to uniaxial orientation.

5. A transparent image-recording sheet according to claim 3 wherein said water-based, toner-receptive coating being coated onto said transparent backing after uniaxial orientation of said film in the machine direction.

6. A transparent image-recording sheet according to claim 5 wherein said toner-receptive coating on said second surface is coated thereon. subsequent to said sheet being subjected to transverse orientation.

7. A transparent image-recording sheet according to claim 2 wherein said sheet is further subjected to orientation in said transverse direction after said water-based, toner-receptive coating has been coated thereon.

8. A transparent image-recording sheet according to claim 2 wherein said sheet further has a toner-receptive coating on said second major surface thereof.

9. A transparent image-recording sheet according to claim 1 wherein said toner-receptive coating on said second major surface is a water-based toner-receptive coating.

10. A transparent image-recording sheet according to claim 1 wherein said imaging copolymer comprises an aliphat alkyl acrylate selected from the group consisting of methyl acrylate, ethyl acrylate, methyl methacrylate, ethyl methacrylate, isobutyl acrylate, isobutyl methacrylate, isodecyl methacrylate, and isobutyl acrylate.

11. A transparent image-recording sheet according to claim 1 wherein said imaging copolymer further comprises a monomer selected from the group consisting of styrene, substituted styrene and vinyl esters.

12. A transparent image-recording sheet according to claim 1 wherein said antistatic agent is selected from the group consisting of steramido-propyldimethyl-β-hydroxy-ethyl ammonium nitrate, N,N'-bis(2-hydroxyethyl)-N-(3'-dodecyloxy-2,2-hydroxylpropyl) methylammonium methylsulfate, and mixtures thereof.

13. A transparent image-recording sheet according to claim 1 wherein said polymeric particle is selected from the group consisting of a 50/50 poly(hexanedioldiacrylate/stearyl methacrylate) particle, a 50/50 poly(-butanedioldiacrylate)/lauryl(meth)acrylate particle, an 80/20 poly(hexanediol-diacrylate)/stearyl(meth)acrylate particle, a 50/50 polymethylmethacrylate/1,6 hexanedioldiacrylate particle, a $C_{14}$ dioldiacrylate particle, a $C_{12}$ dioldi(meth)acrylate particle, and a 40/50/10 poly(hexanedioldiacrylate)/stearyl(meth)acrylate/glycidyl(meth)acrylate particle.

14. An transparent image-recording sheet according to claim 13 further comprising an additional polymeric particle containing from about 50 to about 80 parts hexanedioldiacrylate and from about 50 to about 20 parts stearylmethacrylate, said particle having an average particle size of from about 0.25 μm to about 15 μm.

15. A transparent image-recording sheet according to claim 1 further comprising an additive selected from the group consisting of coalescing agents, wetting agents, crosslinking agents, catalysts, thickeners, adhesion promoters, glycols, and defoamers.

16. A transparent image-recording sheet according to claim 1 wherein said substrate is selected from the group consisting of polyesters, poly(ethylene naphthalate), polystyrenes, cellulose triacetate and mixtures thereof.

* * * * *

UNITED STATES PATENT AND TRADEMARK OFFICE

CERTIFICATE OF CORRECTION

PATENT NO. : 5,310,591

DATED : May 10, 1994

INVENTOR(S) : Bill H. Dodge, et al

It is certified that error appears in the above-indentified patent and that said Letters Patent is hereby corrected as shown below:

Column 6, Line 27, delete "ranges from about" and insert therefor --smaller than--.

Column 14, Line 38, "8.2 g" should read --68.2 g--.

Column 14, Line 45, "0.52%" should read --10.52%--.

Column 14, Line 60, after "0.25 μm" insert --and 8 μm beads were made separately by mixing each with--.

Column 16, Line 25, "(1)" should read --(1%)--.

Column 19, Line 5, "aliphat" should read --aliphatic--.

Signed and Sealed this

Twenty-fifth Day of October, 1994

*Attest:*

BRUCE LEHMAN

*Attesting Officer*

*Commissioner of Patents and Trademarks*